United States Patent [19]

Dewey et al.

[11] Patent Number: 5,084,819
[45] Date of Patent: Jan. 28, 1992

[54] DATA COLLECTION, ANALYSIS, AND RESPONSE SYSTEM AND METHOD

[75] Inventors: James E. Dewey, Saunderstown, R.I.; Dennis B. Pierson, Highridge, N.J.

[73] Assignee: Response Technologies Inc., Wakefield, R.I.

[21] Appl. No.: 592,182

[22] Filed: Oct. 3, 1990

Related U.S. Application Data

[63] Continuation of Ser. No. 269,895, Nov. 10, 1988, abandoned.

[51] Int. Cl.$^5$ .................. G06F 15/38; G09B 23/28; G09B 7/00
[52] U.S. Cl. .................. 364/419; 434/212; 434/358
[58] Field of Search .............. 364/413.01, 413.02, 364/419, 513; 434/353, 355, 356, 358, 359, 322

[56] References Cited

U.S. PATENT DOCUMENTS

| | | | |
|---|---|---|---|
| 3,643,348 | 2/1972 | Azure, Jr. ............ | 434/358 |
| 3,983,364 | 9/1976 | Firehammer ............ | 434/358 |
| 4,464,122 | 8/1984 | Fuller et al. ............ | 434/262 |
| 4,627,818 | 12/1986 | Von Fellenberg ............ | 434/363 |

*Primary Examiner*—Allen R. MacDonald
*Attorney, Agent, or Firm*—Cesari and McKenna

[57] ABSTRACT

An expert data collection, analysis, and response system and method for providing user specific recommendations in a predetermined topic, including reading a data collection form which contains responses to questions in the predetermined topic and based on the responses, selecting user specific recommendations which are subsequently printed for the user.

15 Claims, 4 Drawing Sheets

DATA COLLECTION, ANALYSIS, AND RESPONSE SYSTEM AND METHOD

RELATED APPLICATION

This application is a continuation of Ser. No. 269,895, filed Nov. 10, 1988, now abandoned.

FIELD OF INVENTION

This invention relates to an expert system including both a system and method, and more particularly, to such a system for collecting from a user, remotely completed data in response to questions in a predetermined subject and for immediately generating and printing user specific recommendations concerning the subject.

BACKGROUND OF INVENTION

Expert systems are available today for almost every subject matter to aid individuals in their decision making process. These systems pose a number of questions to a willing individual, and provide some means for the individual to respond to the questions on an interactive basis, typically utilizing a CRT. The system, based on the answers to the questions, then recommends some solution or course of action to be undertaken.

Prior art expert systems have met with little or no success for a number of reasons, perhaps the greatest of which has been individual reluctance to utilize these systems. Many complex systems require an operator attending the system at all times. If unattended systems are utilized, many individuals are afraid to use such a system. Many people are not computer literate or worse, are computer phobic, unwilling to deal with a computer. Additionally, most people are reluctant to stand in front of a display screen in public to answer many personal and private questions. Further, while one individual is busy answering questions others are precluded from utilizing the system and may just walk away without using and perhaps benefitting from such a system. Finally, there is the consideration that current systems frequently do not provided the user with a written copy of the recommendations which would enable them to take the recommendations home to study and perhaps implement at a later date.

SUMMARY OF INVENTION

It is therefore an object of this invention to provide an expert system and method for gathering and analyzing data, and generating recommendations, which is easy to use and encourages use of the system by collecting the data by means of privately and remotely completed data forms.

It is a further object of this invention to provide such a system and method which is efficient and allows many users to access the system by collecting the data quickly in one transaction.

It is a further object of this invention to provide such a system and method which immediately generates and prints user specific recommendations in response to the analyzed data.

It is a still further object of this invention to provide such a system which is completely integrated in one compact portable unit.

This invention results from the realization that a truly novel and useful expert data collection and analysis system may be achieved by providing a system which includes an optical reader which quickly and efficiently collects data from a previously completed data collection form, makes a number of recommendations based on the user's responses, and provides a written report based on those recommendations.

This invention features an expert system for data collection and analysis based on user supplied responses to questions in a predetermined topic. The expert system includes means for reading a data collection form containing the user responses. In addition, means are provided for selecting user specific recommendations in the predetermined topic based on a comparison of criteria elements with the user's responses. Printer means are provided for supplying a printed report of the selected user specific recommendations.

In one embodiment, the system includes an optical reader and the data collection form includes an optically readable card. The optical reader also includes means for marking the card once it has been read by the optical reader to prevent multiple inputs of the same processed data. There are means for rejecting an improperly or incorrectly marked data collection form and there are means for weighting each of the user responses and for combining the weighted values to arrive at a score for the user's responses. The means for weighting includes means for assigning a numerical value to each of the user's responses and for combining the numerical values to arrive at a first score based on the user's responses to all the questions. In addition, a second score may be derived from the responses to fewer than all of the questions.

The system may tabulate the user responses and score, and may print a report summarizing the results. In order to facilitate tabulating all of the user responses and generating a summary report, the expert system may also include means for storing the user responses and scores within the system.

The invention also features a method of generating user specific recommendations in at least one predetermined topic including the steps of reading a user's responses to questions, comparing one or more responses with predetermined criteria elements, selecting at least one user specific recommendation based on the comparison, and printing the at least one selected user specific recommendation.

In one embodiment, the method further includes obtaining a weighted numerical value for each response to each question and combining the weighted values to compute at least one score for the user responses. In addition, the method may include selecting at least one user specific recommendation based on the score. The method may further include reading user specific responses from optically readable, user marked, data collection forms utilizing an optical reader. In addition, the user responses and scores may be stored within the system and tabulated to provide a summary report.

DESCRIPTION OF PREFERRED EMBODIMENT

Other objects, features and advantages will occur from the following description of a preferred embodiment and the accompanying drawings in which.

An expert data collection, analysis and response system according to this invention may be accomplished by providing an integrated and portable system including an optical reader, printer, and central processing unit. The system may also include a power supply and disk drive assembly. The expert system is adapted to receive input from a remotely completed data collection form. The data is then transferred to the central processing unit and analyzed. Subsequently, a user specific report is generated and provided to the user by means of a printer. Additionally, the system may provide a summary report listing a tabulation of the responses from a number of users.

Figure 1:
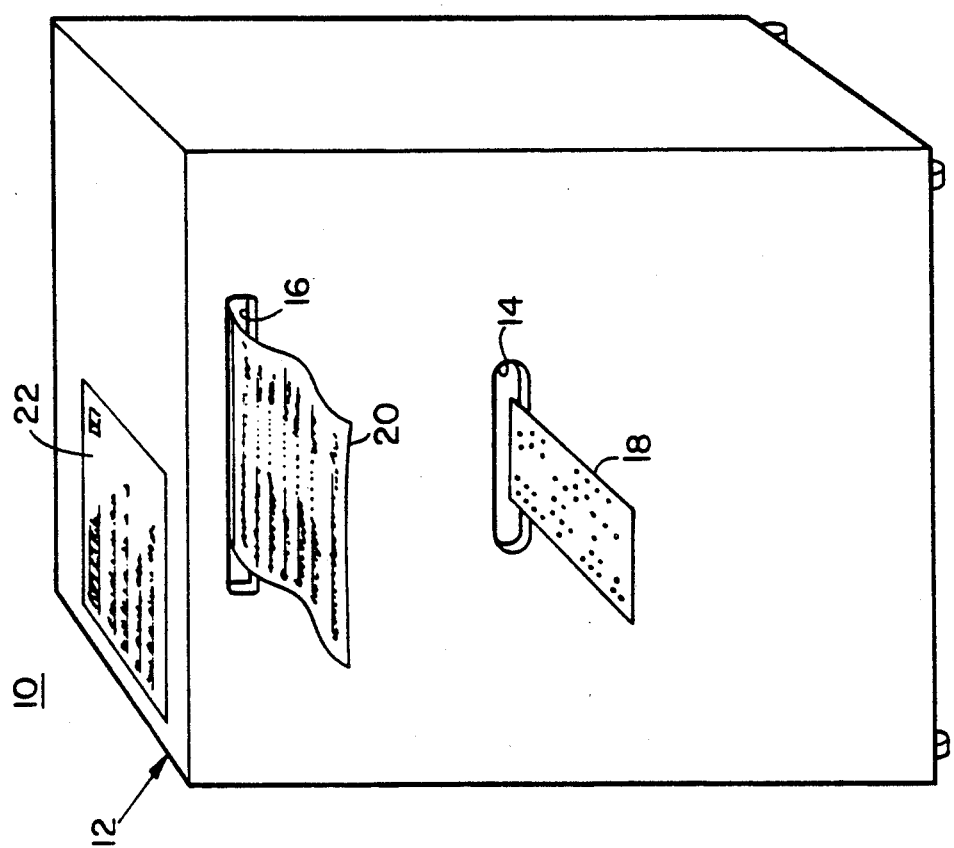
FIG. 1 is a axonometric view of the expert data collection and analysis system according to this invention.

The expert data collection, analysis, and response system 10, FIG. 1, according to this invention includes enclosure 12, which houses among other items optical reader 14 and printer 16. Optical reader 14 is adapted to read information from data collection form 18 which is a remotely completed optically readable marked form containing responses to a number of questions on a predetermined topic. Based on the analysis of the responses, system 10 generates report 20 which contains a number of user specific recommendations in various subjects on the topic. Instructions 22 facilitate ease of use of the system by guiding the user in the step by step operation of the system.

Figure 2:
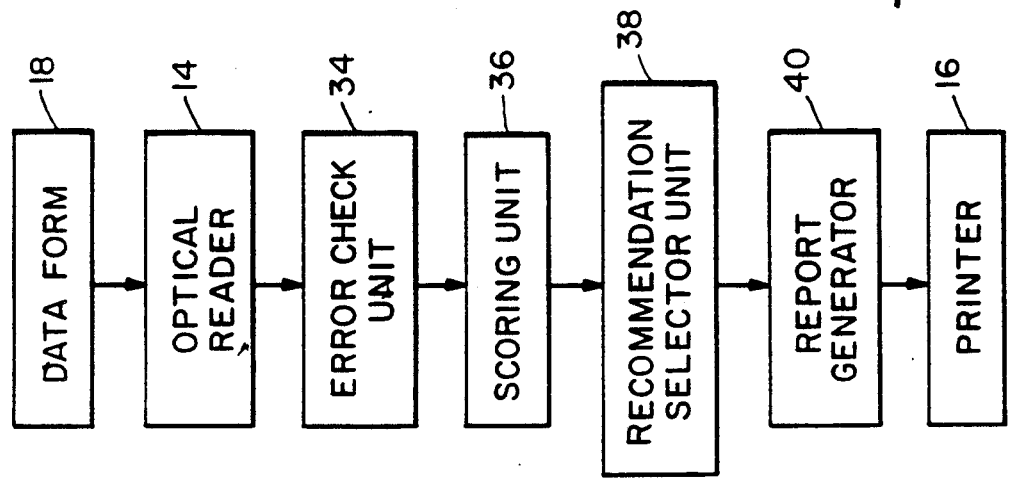
FIG. 2 is a block diagram of the expert system of FIG. 1.

The operation of the expert data collection, analysis, and response system is more clearly illustrated in FIG. 2, wherein data form 18 is received as input to optical reader 14. The optical reader may be any commercially available unit which is adapted to optically read a remotely completed data form. Such an optical reader is available from Chatsworth Data Corporation of Chatsworth, Calif.

After reading data form 18, the system inputs the data to error check unit 34 which verifies that the data form has not been previously submitted to the system and is properly filled out. Upon ascertaining that the data is valid, the data may optionally be routed to scoring unit 36 which obtains the weighted values for all the user's responses and tabulates a total score and, if the particular topic analysis program requires it, any subscore which is based on responses to less than all the questions.

The data subsequently enters recommendation selector 38 which makes a comparison between the user responses and a plurality of sets of criteria elements. If any of the user's responses match a given set of criteria, recommendation selector 38 selects the recommendation associated with the criteria set and routes it to report generator 40. Report generator 40 accumulates all of the recommendations selected by recommendation selector 38 and after evaluation of all the criteria elements, formats a user specific report which is forwarded to printer 16 for printing.

Figure 3:
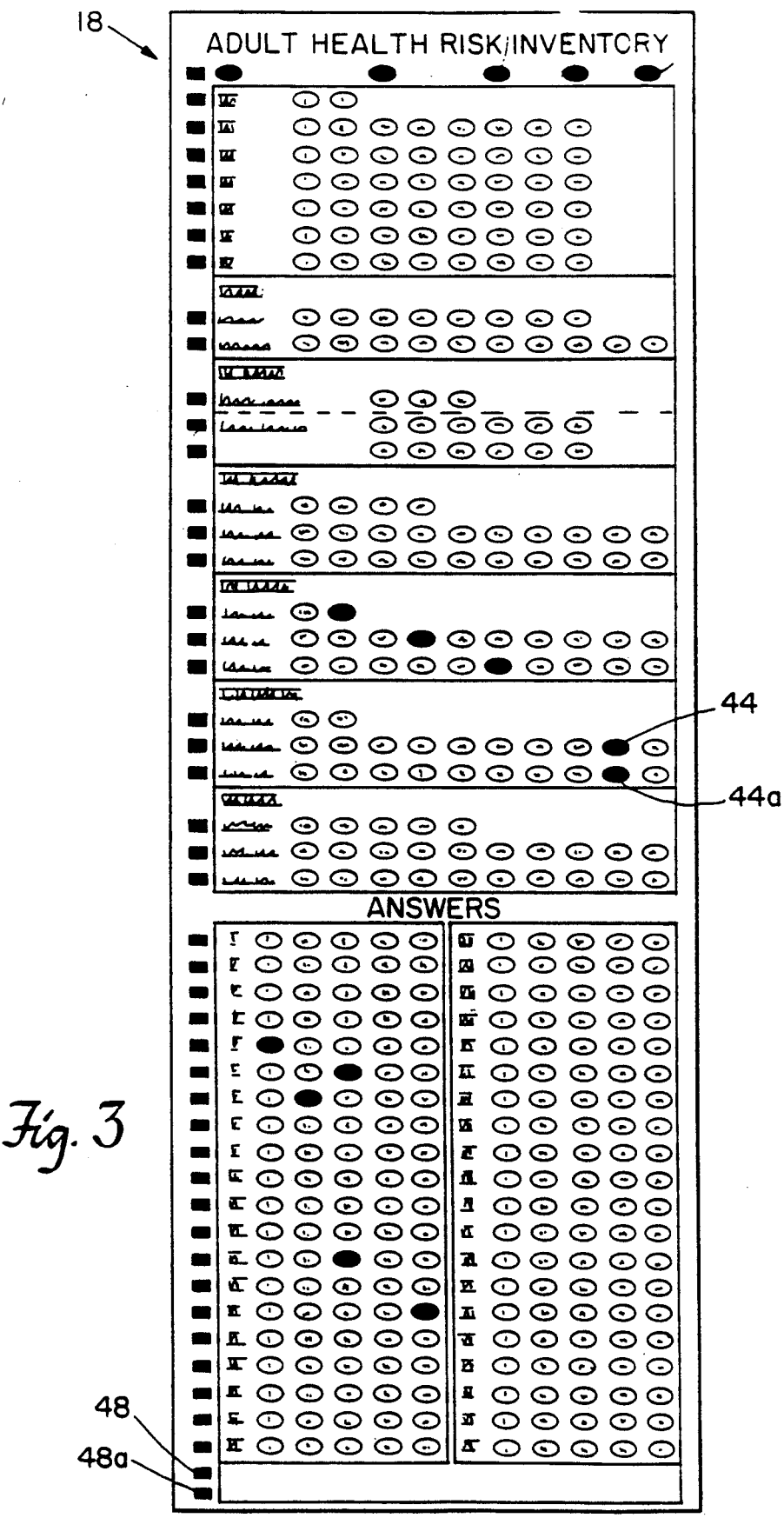
FIG. 3 is a sample remotely completed data collection form.

In a preferred embodiment, data form 18, FIG. 3, may be a remotely completable and optically readable data collection card on which a user responds to questions in the predetermined topic which are printed on a separate form. The user responds to the questions by darkening the appropriate circled area which corresponds to the response the user has selected such as response 44 and 44a to question D12 which corresponds to the value 88. In addition, data collection card 18 may contain marked areas 46, 46a and 46b which are read by error check unit 34 to determine in which topic the user has elected to respond to questions. If these marks represent an invalid code for a choice of topics, the card is returned to the user. If the code is valid, error check unit 34 will scan all the responses to insure that all the questions have been answered and that no questions have two responses. If all the responses are valid, optical reader 32 contains a marking device such as a Hewlett Packard ink jet print head which marks card 18 such as at 48 and 48a, indicating that the card has been previously processed to prevent a user from reentering the same data collection card a number of times thereby improperly influencing the summary results that may be tabulated.

Figure 4:
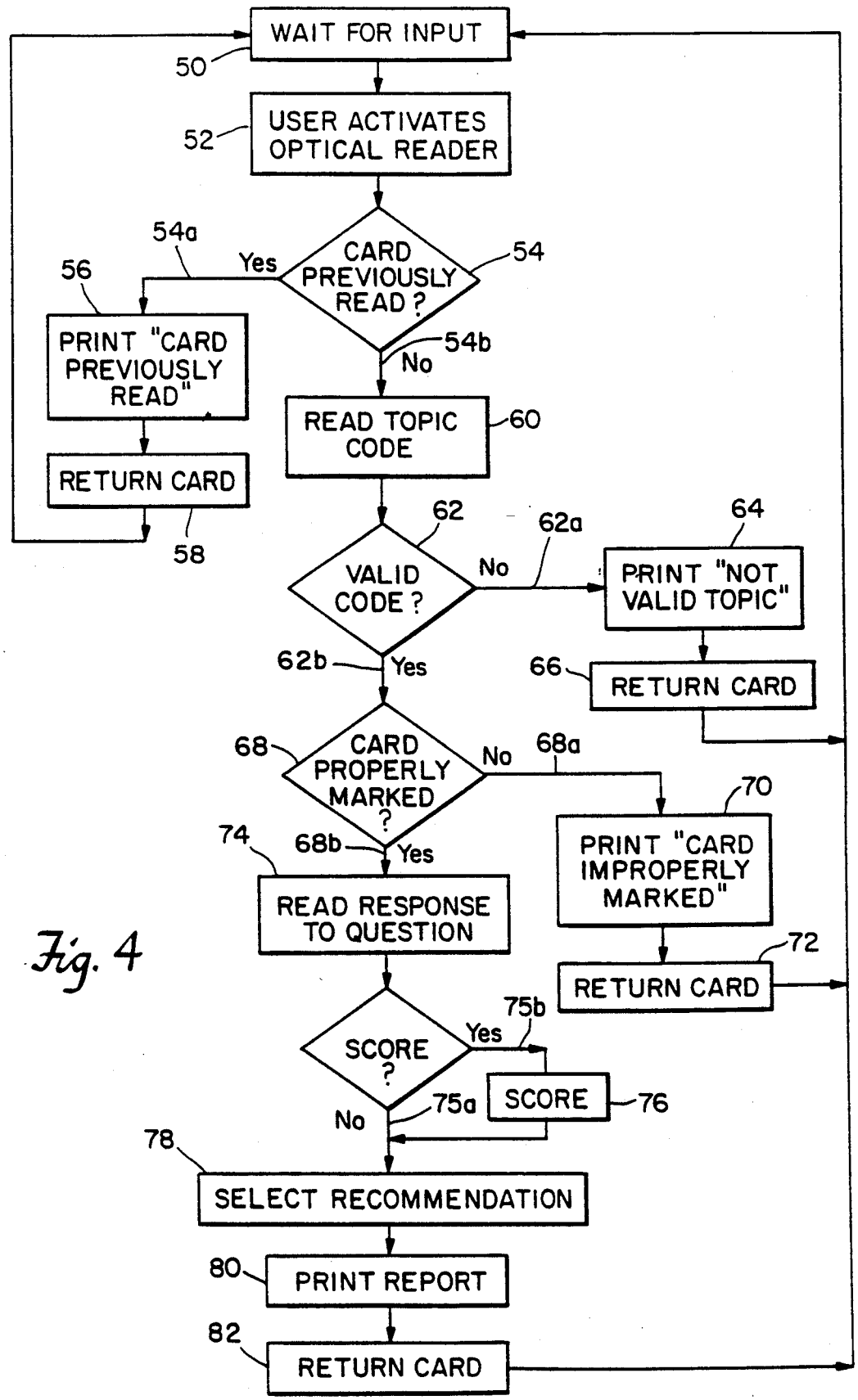
FIG. 4 is a flow chart detailing the operation of the expert data collection and analysis system according to this invention.

Upon power-up of the expert data collection and analysis system 10, a standard central processing unit located inside cabinet 12 and powered by an appropriate power supply, loads operating system software from memory or a disk drive. After initializing any peripherals such as optical reader 14, printer 16, or other optional peripherals, system 10 waits for input, step 50, FIG. 4. Once the user activates optical reader 14 with data collection form 18, step 52, the error check unit scans the data collection form to determine if the card has been previously read, step 54. If the card has been previously read, branch 54a, the system activates printer 16 to print a message indicating that the card has been previously read, step 56, returns the card to the user, step 58, and returns control to the system to await the next input, step 50. If the error check unit determines that the card has not been previously read, branch 54b, error check unit 34 reads the topic codes marked on the form, step 60. The error check unit then evaluates the code to determine if it is valid, step 62. If the code is not valid, branch 62a, the system activates printer 16 to output a message indicating that the topic selected is not a valid one, step 64, then returns the card to the user, step 66, and returns control to the system software to await further input, step 50. If error check unit 34 determines that the topic code is valid, branch 62b, the error check unit 34 next determines whether or not data collection form 18 has been properly marked, step 68. If the card has not been properly marked, branch 68a, the system activates printer 16 to output a message that the card is improperly marked, step 70, returns the card to the user, step 72, and returns control to the system software to await further input, step 50.

If data collection form 18 has not been previously read, contains a valid topic code, and has been properly marked, branch 68b, system 10 reads the responses to the questions marked on the form, step 74. If scoring is required, branch 75b, scoring unit 36 scores the responses, step 76. If no scoring is to be performed, branch 75a, or after scoring is performed at step 76, recommendation selector 38 performs the required comparisons and selects the appropriate recommendations, step 78. The recommendations and scores may then be printed in the form of a report, step 80, the data collection form returned to the user, step 82, and control returned to the system, step 50, to await further input.

Table 1 illustrates a representative sampling of the type of questions that might be asked for the topic Health Risk Inventory. Question D12, which corresponds to D12 on data collection form 18, asks the user to mark his diastolic blood pressure. In this example, the user responded "88" and appropriately marked boxes 44 and 44a on data collection form 18. This table of questions is not exhaustive, but is merely a representative sampling of the types of questions that might be asked. For illustrative purposes, the answers selected have been marked with an asterisk.

TABLE 1

TOPIC: HEALTH RISK INVENTORY

D11. What is your systolic blood pressure (the higher number)
SYS/BP: 135 (mark correct circles on form or leave blank if unknown)
D12. What is your diastolic blood pressure (the lower number)
DIAS/BP: 88 (mark correct circles on form or leave blank if unknown)
5. Have your had your blood pressure checked in the past year
(1) Yes    (2) No
6. Have your every been told by a doctor that you have high blood pressure
(1) No
(2) Yes, but not the last time it was checked.
*(3) Yes, and I still have high blood pressure.
7. Are your now being treated for high blood pressure
(1) Yes    *(2) No
13. Do you now or did you ever smoke cigarettes
(1) No, never smoked (only tried it)
(2) Yes, but quit more than 1 year ago
*(3) Yes, but quit in the last year
(4) Yes, I smoke now
15. For how many years have you smoked (or did you smoke before quitting)
(1) None, I never smoked
(2) Less than 5 years
(3) 5 to 10 years
(4) 11 to 20 years
*(5) More than 20 years

*Indicates the selected response

Figure 5:
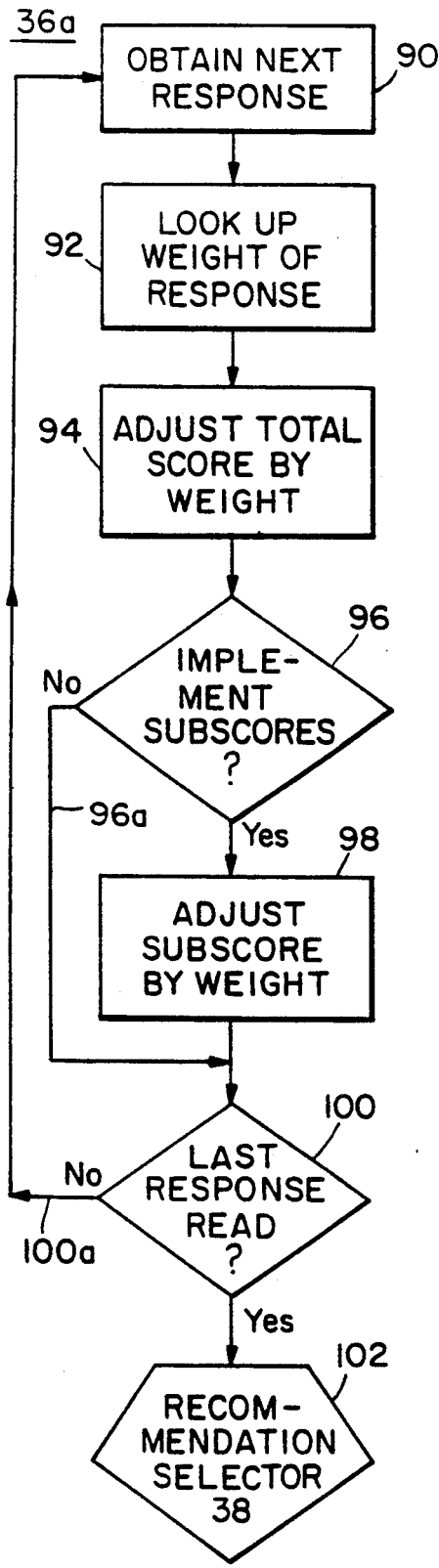
FIG. 5 is a more detailed flow chart showing the operation of the scoring unit of FIG. 2.

After error check unit 34 has validated the data and read the responses, scoring unit 36a, FIG. 5, performs the scoring by first obtaining the next response to be scored, step 90. The scoring unit next assigns a weight to the response by obtaining, from a look-up table, a numerical value by which to adjust the score, step 92. As illustrated in Table 2, which shows the effects that each response has on the total score, a first evaluation is performed on the response to question D11, the systolic blood pressure, and question D12, the diastolic blood pressure. If the response to question D11 is less than 140 and the response to question D12 is less than 90, then 0 points are deducted from the maximum score. This score adjustment procedure is performed at step 94.

Total score computation may be performed in several ways. A maximum score, for example 100, may be established, with the various responses for each question being assigned a numerical value which is subtracted from the maximum score. An alternative method involves establishing an optimal score, for example 50, with the various responses to each question added or subtracted from the optimal score, based on the response. A yet additional scoring adjustment routine would involve beginning with a score of zero and having the weight of the various responses add to the beginning score. For illustrative purposes in this example, a maximum score of 100 has been established with the weights of the various responses being subtracted from that number. Table 2, line 3, indicates that 4 points were deducted from the maximum score since the user selected response 3 to question 6. Table 2 illustrates that the responses generated a total of 14 points deducted from the maximum score of 100 giving the user a total score of 86.

TABLE 2

Effects on Total Score:

Original Maximum Score = 100
IF SYS/BP < 140 AND DIAS/BP < 90 THEN DEDUCT
0 POINTS FROM MAXIMUM SCORE
IF Q(5) = 1 THEN DEDUCT 0 POINTS FROM
MINIMUM SCORE
IF Q(6) = 3 THEN DEDUCT 4 POINTS FROM
MAXIMUM SCORE
IF Q(7) = 2 AND Q(6) = 3 THEN DEDUCT
4 POINTS FROM MAXIMUM SCORE
IF Q(13) = 3 THEN DEDUCT 2 POINTS FROM
MAXIMUM SCORE
IF Q(15) = 5 THEN DEDUCT 4 POINTS FROM
MAXIMUM SCORE
Deductions = 14
TOTAL SCORE = 86

Scoring unit 36a next determines whether it is to implement any subscoring, step 96. Subscoring involves catagorizing a number of questions that relate to a similar subject area of the topic in question. The system derives a subscore for this subject area based on the response to the questions. For example, Table 3 illustrates how a heart disease risk subscore and a cancer risk subscore might be derived. Question 6 asks if the user has ever been told by a doctor that he or she has high blood pressure. The user responds by choosing response 3, indicating he still has high blood pressure. Scoring unit 36a then adds 4 points to the heart disease subscore (the original score being 0). Since response 5 has been selected to question 15, indicating the user has smoked more than 20 years, an additional 4 points are added to the heart disease subscore and 4 points are added to the cancer subscore. After the responses to all of questions 6, 7, 13 and 15 have been scored, the heart disease subscore is 14 and the cancer risk subscore is 6. This processing is accomplished at step 98. If no subscoring is to be implemented, branch 96a, the system proceeds to step 100 to determine if all the responses have been read and scored. If there are still more responses to be scored, branch 100a, step 90 is repeated to obtain the next response and the process of scoring, performed by scoring unit 36, is repeated. If the last response has been read, the operation proceeds to recommendation selector unit 38, step 102.

TABLE 3

Effects on Heart Disease Risk and Cancer Risk subscores:

ORIGINAL SCORE = 0
IF Q(6) = 3 THEN ADD 4 POINTS TO HEART DISEASE
SUBSCORE
IF Q(7) = 2 AND Q(6) = 3 THEN ADD 4 POINTS TO
HEART DISEASE SUBSCORE
IF Q (13) = 3 THEN ADD 2 POINTS TO HEART DISEASE
SUBSCORE AND 2 POINTS TO CANCER SUBSCORE
IF Q (15) = 5 THEN ADD 4 POINTS TO HEART DISEASE
SUBSCORE AND 4 POINTS TO CANCER SUBSCORE
HEART DISEASE SUBSCORE = 14
CANCER DISEASE SUBSCORE = 6

Figure 6:
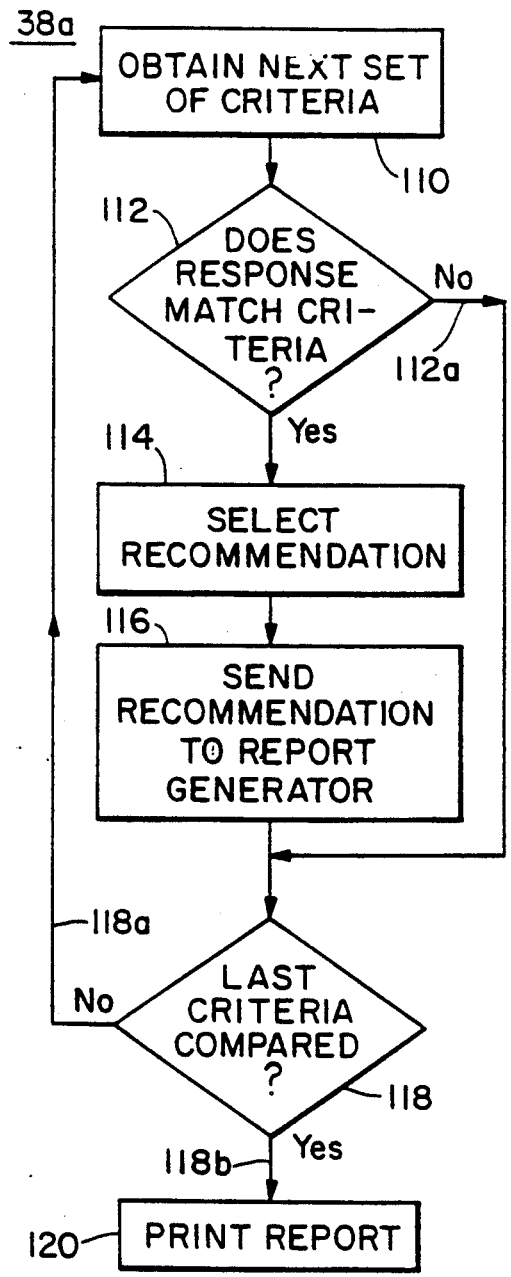
FIG. 6 is a more detailed flow chart of the recommendation generator of FIG. 2, according to the present invention.

The operation of recommendation selector unit 38a, begins by obtaining the first set of criteria to be matched, step 110, FIG. 6. A set of criteria may include a single criteria element such as the first element in Table 4, an example of a Table of Criteria. As disclosed in Table 4, a set of criteria may also include multiple criteria elements such as the second element in Table 4 which compares response 3 of question 6 and response 2 of question 7 with the user's responses. If the user's responses match all the criteria elements, the system will print the message about hypertension. Alternatively, element 3 of Table 4 illustrates how any one of three responses may trigger the selection of a particular recommendation: if the response to question 13 is less than 4 or the response to question 6 equals 1 or the response to question 7 equals 2, the general message "you scored well in:" is printed followed by further evaluation of two additional criteria elements. If the response to question 13 is less than 4, the recommendation "smoking" is appended to the message "you scored well in". Additionally, if the response to question 6 equals 1 or the response to question 7 equals 2 the recommendation "low stress level" is selected and also appended to the recommendation "you scored well in".

The matching of the user's responses with the set of criteria being evaluated is accomplished at step 112. If the responses match all of the criteria elements within the set, the recommendation is selected, step 114, and routed to the report generator, step 116, for subsequent printing. If the user response does not match the set of criteria presently being evaluated, branch 112a, the system determines whether or not the last set of criteria has been compared, step 118. If the last set of criteria has not been compared, branch 118a, the system obtains the next set of criteria, step 110, and proceeds as described above. Once the last criteria has been compared, branch 118b, the system proceeds to print the report, step 120.

TABLE 4

Table of Criteria:
IF Q(13) = 3 THEN PRINT THE FOLLOWING:
"++Quitting cigarettes was perhaps the best health descision you'ver ever made. CONGRATULATIONS! Stick with it... the smking habit, while difficult to break, is easy to reaquire. Don't let it happen to YOU!"
IF Q(6) = 3 AND Q(7) = 2 THE PRINT THE FOLLOWING:
"You reported that you have hypertension but are no longer being treated for it. Since symptoms of high blood pressure are usually not noticeable to the person who has it, it is important that regular treatment be continued until a doctor tells you differently."
IF Q(13) < 4 OR Q(6) = 0 1 OR Q(7) = 2 PRINT:
"You scored well in:"
If Q(13) < 4 print "not smoking".
If Q(6) = 1 or Q(7) = 2 print "low-stress level".
IF SBP > 130 OR DBP > 90 OR Q(6) > 2 THEN PRINT:
"need improvement message" for "blood pressure".
IF Q(6) > 1 AND Q(7) = 1 THEN CATEGORY (1) = 1 ELSE CATEGORY (1) = 0
IF Q(13) = 4 AND CATEGORY (1) = 1 PRINT:
"High blood pressure combined with smoking greatly increases your risk of heart attacks".
IF Q(13) = 4 AND CATEGORY (1) = 0 PRINT:
"Even though you do not have high blood pressure, you should be aware that smoking increases your chances for heart attacks".
If total score > 79 and < 90 pring "Good Category (scores 80 to 89)".
<<CANCER RISK SUB-SCORE>> You lost (6) points on questions relating to risks of cancer. Family history is the only cancer risk that cannot be changed.
<<HEART DISEASE RISK SUBSCORE>> You lost (14) points on questions relating to risks of heart disease. As stated above, only family history cannot be changed.
++You can be proud of the good health habits you have. If you have questions about your health or health risks, you should contact your private physician.

Report generator 40 organizes the recommendations selected by recommendation selector 38 as well as other standard information, such as headings, into one cohesive user specific recommendation report, illustrated in Table 5. The report may begin with the title "Health Survey System" followed by a score as computed by scoring unit 36 and the recommendation "Good" category derived from recommendation selector unit 38. The additional recommendations selected are printed as are any subscores computed earlier. In addition, report generator 40 may generate some general information and disclaimers where appropriate, such as contacting a physician for a more detailed evaluation or alerting the user to the fact that the system is intended to serve as an "Awareness Tool" only.

TABLE 5

HEALTH SURVEY SYSTEM
YOUR SCORE WAS 86 OUR OF 100 POSSIBLE POINTS
That places you in the following health risk category
Good category (Scores 80 to 89)
++You scored well in:
NOT-SMOKING     LOW STRESS LEVEL
++You can be proud of the good health habits you have.
If you have questions about your health or health risks, you should contact you private physician.
HEALTH AREAS COVERED IN QUESTIONNAIRE
++Quitting cigarettes was perhaps the best health decision you've ever made. CONGRATULATIONS! Stick with it - the smoking habit, while difficult to break, is easy to reaquire. Don't let it happen to YOU!
<<CANCER RISK SUB-SCORE>> You lost 6 points on questions relating to risks of cancer. Family history is the only cancer risk that cannot be changed.
<<HEART DISEASE SUB-SCORE>> You lost 14 points on questions relating to risks of heart disease. As stated above, only family history cannot be changed.
IN CONCLUSION
**There IS room for improvement in the following health risk areas:
BLOOD PRESSURE
**While there is no guarantee that you will live longer if you mkae improvements in the areas above, statistics suggest that your odds will be greatly improved if you do. In any event, lifestyle improvement and change is worth considering.
**PLEASE NOTE: This appraisal is an AWARENESS TOOL only. It is NOT diagnostic in nature, and in in NO WAY intended to contradict or replace the advide of you personal physician. When in doubt, it is ALWAYS best to seek professional one-on-one consultation.
**Thank you for taking part in the program - AND GOOD HEALTH TO YOU!

The system may accumulate and store within its memory or on a disk drive the scores of individual users as well as each individual user's response to each question. This information stored within the system, may be summarized and reported at the system location, at the request of an individual responsible for the system. It may also be reported remotely by means of an optional modem installed within the system. Table 6 illustrates the type of information that may be summarized. For example, out of 74 users responding to the questionnaire, 45% had not had their blood pressure checked within the last year. This information may be used by employers, schools, or business utilizing the expert data collection and analysis system to plan some course of action or strategy such as employee counseling, marketing, or strategic growth planning.

TABLE 6

| SUMMARY REPORT | DATE: TODAY'S DATE |
|---|---|
| MALES AND FEMALES CONBINED | |
| RISK ITEMS FROM QUESTIONNAIRE | PERCENTAGES |
| 1. HAVE NOT HAD BP CHECKED IN LAST YEAR | 45% |
| 2. HAVE BEEN TOLD THEY HAVE HIGH BLOOD PRESSURE | 14% |
| 3. SMOKE CIGARETTES | 29% |
| 4. HAVE SMOKED MORE THAN 10 | 21% |

TABLE 6-continued

| YEARS | |
|---|---|
| MEAN SCORE | 74.8 |
| NUMBER OF CASES | 74 |

Although specific features of the invention are shown in some drawings and not others, this is for convenience only as each feature may be combined with any or all of the other features in accordance with the invention.

Other embodiments will occur to those skilled in the art and are with the following claims:

What is claimed is:

1. An expert data collection, analysis and response system comprising:
   a reader for reading a marked data collection form containing user responses to questions in at least one predetermined topic;
   means for comparing one or more of said responses with predetermined criteria elements and selecting at least one recommendation based on the comparison;
   means for printing each recommendation, and
   means for preventing the rereading of user responses on said marked data collection form.

2. The system of claim 1 in which said means for comparing and selecting includes means for matching one of said user responses with a single criteria element having an associated recommendation, and for providing that recommendation if the response matches the single criteria element.

3. The system of claim 1 in which said means for comparing and selecting includes means for matching more than one of said user responses with a plurality of criteria elements having an associated recommendation, and for providing that recommendation if the responses match the plurality of criteria elements.

4. The system of claim 1, further including means for combining said selected recommendations and generating a user recommendation report to be printed by said means for printing.

5. The system of claim 1 further including means for weighting said user responses;
   means for combining the weighted user responses to derive at least one score; and
   means for providing said score to said means for printing.

6. The system of claim 5 in which said means for weighting includes means for assigning a numerical value to said user responses.

7. The system of claim 5 in which said means for comparing and selecting includes means for selecting a recommendation based on said score.

8. The system of claim 5 in which said means for combining derives a first score from the user's responses to all of the questions.

9. The system of claim 5 in which said means for combining derives a second score from the user's responses to less than all of the questions.

10. The system of claim 5 further including means for storing user responses and scores within the system.

11. The system of claim 10 further including means, responsive to said means for storing, for generating a summary report tabulating a number of different users' responses to one or more questions.

12. The system of claim 1 in which said reader is an optical reader and said marked data collection form is a remotely completed optically readable card.

13. The system of claim 1 wherein said rereading prevention means includes means for marking said data collection form one it has been read by said reader.

14. The system of claim 13 wherein said rereading prevention means also includes means for rejecting a previously read data collection form.

15. The system of claim 1 further including means for rejecting an improperly or incorrectly marked data collection form.

* * * * *